(12) United States Patent
Abido et al.

(10) Patent No.: US 8,250,007 B2
(45) Date of Patent: Aug. 21, 2012

(54) METHOD OF GENERATING PRECEDENCE-PRESERVING CROSSOVER AND MUTATION OPERATIONS IN GENETIC ALGORITHMS

(75) Inventors: Mohammad Ali Abido, Dhahran (SA); Ashraf Mohamed Attia Elazouni, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 534 days.

(21) Appl. No.: 12/588,210

(22) Filed: Oct. 7, 2009

(65) Prior Publication Data
US 2011/0082821 A1 Apr. 7, 2011

(51) Int. Cl.
G06G 7/122 (2006.01)
G06F 15/18 (2006.01)
(52) U.S. Cl. ............................................. 706/13; 706/19
(58) Field of Classification Search ................ 706/13
See application file for complete search history.

(56) References Cited

U.S. PATENT DOCUMENTS

| 5,819,244 | A | 10/1998 | Smith |
| 5,970,487 | A | 10/1999 | Shackleford et al. |
| 2006/0009209 | A1 | 1/2006 | Rieser et al. |
| 2007/0133504 | A1 | 6/2007 | Shin et al. |
| 2008/0195565 | A1 | 8/2008 | Eshelman |

FOREIGN PATENT DOCUMENTS

| CN | 101051361 A | 10/2007 |
| EP | 0594251 A2 | 4/1994 |
| JP | 2003016421 A | 1/2003 |
| JP | 2003196635 A | 7/2003 |
| TW | 272779 B | 2/2007 |
| WO | WO2006011866 A2 | 2/2006 |

OTHER PUBLICATIONS

Jiang, A Genetic algorithm for multiple resource-constrained project scheduling [online], 2004, [retrieved on Apr. 18, 2012]. Retrieved from the Internet: <URL:http://bluecoat-02/?cfru=aHR0cDovL3-JvLnVvdy5IZHUuYXUvY2dpL3ZXdjb250ZW50LmNnaT9ma-WxlbmFtZT0wJmFydGGljbGUMTI1NiZjb250ZXh0PXRoZXNNlcy-ZoeXBIPWFkZGI0aW9uYWw=>.*

Roca et al., Solving an Extended Resource Leveling Problem with Multiobjective Evolutionary Algorithms [online], 2004, [retrieved on Apr. 18, 2012]. Retrieved from the Internet:<URL:http://www.waset.org/journals/waset/v46/v46-124.pdf>.*

Leu, Resource leveling in construction by genetic algorithm-based optimization and its decision support system application [online], 2000, [retrieved on Apr. 18, 2012]. Retrieved from the Internet:<URL:http://www.sciencedirect.com/science/article/pii/S0926-580599000114>.*

Hegazy, Optimization of Resource Allocation and Leveling Using Genetic Algorithms [online], 1999, [retrieved on Apr. 18, 2012]. Retrieved from the Internet:<URL:http://www.meng-pm.org/wsq/Course/ResourceLevelingUsingGeneticAlgorithms.pdf>.*

* cited by examiner

Primary Examiner — Alan Chen
Assistant Examiner — Nathan Brown, Jr.
(74) Attorney, Agent, or Firm — Richard C. Litman

(57) ABSTRACT

A method for generating precedence-preserving crossover and mutations operations for genetic algorithms is provided. The method is based on the determination of activities' Forward Free Float (FFF) and Backward Free Float (BFF) values, utilizing these float values in randomly selected forward and backward paths, respectively. The method may be applied to the finance-based scheduling domain using large scale projects, with the chromosomes of the genetic algorithm encoding activities' start times in a resource-constrained scheduling problem.

7 Claims, 19 Drawing Sheets

Parent 1

Parent 2

| Backward Free Floats (BFF) | | | | | | | | | | | | | |
|---|---|---|---|---|---|---|---|---|---|---|---|---|---|
| Parents | A | B | C | D | E | F | G | H | I | J | K | L | M |
| 1 | 0 | 0 | 0 | 0 | 1 | 1 | 0 | 0 | 1 | 0 | 1 | 0 | 0 |
| 2 | 0 | 0 | 0 | 0 | 3 | 3 | 2 | 1 | 2 | 0 | 0 | 0 | 1 |

Child 1

Child 2

| A | B | C | D | E | F | G | H | I | J | K | L | M |
|---|---|---|---|---|---|---|---|---|---|---|---|---|
| 0 | 0 | 0 | 0 | 2 | 3 | 2 | 3 | 4 | 6 | 7 | 7 | 10 |

Activity

Activity start time

| Mutation probability percentage | Crossover probability percentage | | | | | | | | | |
|---|---|---|---|---|---|---|---|---|---|---|
| | Conventional GA | | | | | Proposed GA | | | | |
| | 60 | 70 | 80 | 90 | 100 | 60 | 70 | 80 | 90 | 100 |
| Processing time (Seconds) | | | | | | | | | | |
| 1 | 6.203 | 6.766 | 6.609 | 6.594 | 6.563 | 6.781 | 6.984 | 6.938 | 6.812 | 7.063 |
| 5 | 9.422 | 9.094 | 9.422 | 9.203 | 9.297 | 8 | 8.812 | 8.469 | 8.531 | 8.547 |
| 10 | 21.297 | 21.375 | 21.609 | 21.14 | 21.109 | 10.797 | 10.016 | 11.14 | 10.75 | 10.453 |
| 15 | 88.218 | 77.11 | 75.063 | 74.734 | 76.141 | 12.157 | 13.828 | 13.063 | 13.75 | 14.5 |
| 20 | 321.875 | 308.266 | 361 | 447.172 | 393.36 | 15.359 | 17.391 | 16.188 | 16.922 | 10.063 |
| Project Profit | | | | | | | | | | |
| 1 | 8747.96 | 8708.82 | 8730.4 | 8734.91 | 8738.65 | 8750.5 | 8752.55 | 10437.38 | 10442.94 | 8741.71 |
| 5 | 8741.71 | 8731.68 | 10436.42 | 8741.71 | 8748.27 | 12147.46 | 10444.96 | 12148.97 | 8753.81 | 12148.97 |
| 10 | 8752.04 | 8752.55 | 8752.8 | 10437.19 | 8754.54 | 8756.82 | 12148.71 | 12148.97 | 12148.48 | 10447.51 |
| 15 | 8754.54 | 8752.04 | 8748.27 | 8748.27 | 8752.55 | 12148.97 | 10444.96 | 12148.97 | 12148.97 | 12148.97 |
| 20 | 10439.71 | 10439.46 | 8752.55 | 10432.37 | 12148.97 | 12148.97 | 12148.97 | 12148.97 | 12148.97 | 12146.7 |
| Project duration (days) | | | | | | | | | | |
| 1 | 31 | 31 | 31 | 31 | 31 | 31 | 31 | 30 | 30 | 31 |
| 5 | 31 | 31 | 30 | 31 | 31 | 29 | 30 | 29 | 31 | 29 |
| 10 | 31 | 31 | 31 | 30 | 31 | 31 | 29 | 29 | 29 | 30 |
| 15 | 31 | 31 | 31 | 31 | 31 | 29 | 30 | 29 | 29 | 29 |
| 20 | 30 | 30 | 31 | 30 | 31 | 29 | 29 | 29 | 29 | 29 |
| Percentage of infeasible solutions ((number of infeasible solutions/total number of solutions)×100) | | | | | | | | | | |
| 1 | 29.13 | 28.1 | 28.1 | 28.8 | 29.1 | 0.019 | 0.018 | 0.037 | 0.028 | 0.055 |
| 5 | 258.91 | 260.6 | 267.9 | 262.8 | 257 | 0.019 | 0.019 | 0.021 | 0.039 | 0.057 |
| 10 | 1419.1 | 1421.8 | 1458.2 | 1397.6 | 1437.8 | 0.023 | 0.037 | 0.027 | 0.052 | 0.083 |
| 15 | 8124.2 | 7070.3 | 6863.2 | 6829.2 | 6991.6 | 0.019 | 0.024 | 0.044 | 0.049 | 0.084 |
| 20 | 31764.6 | 30358.7 | 35229.3 | 43887.6 | 38740.3 | 0.029 | 0.035 | 0.049 | 0.051 | 0.176 |

*Fig. 17*

| Mutation probability percentage | Crossover probability percentage | | | | | | | | | |
|---|---|---|---|---|---|---|---|---|---|---|
| | Conventional | | | | | Proposed | | | | |
| | 60 | 70 | 80 | 90 | 100 | 60 | 70 | 80 | 90 | 100 |
| Processing Time (Seconds) | | | | | | | | | | |
| 1 | 3.469 | 3.297 | 3.375 | 3.422 | 3.282 | 2.531 | 2.625 | 2.657 | 2.484 | 2.64 |
| 5 | 105.281 | 102.453 | 98.671 | 95.469 | 106.516 | 2.5 | 2.671 | 2.562 | 2.609 | 2.796 |
| 10 | -- | -- | -- | -- | -- | 2.656 | 2.61 | 2.766 | 2.531 | 2.64 |
| 15 | -- | -- | -- | -- | -- | 2.719 | 2.64 | 2.766 | 2.594 | 2.563 |
| 20 | -- | -- | -- | -- | -- | 2.594 | 2.672 | 2.656 | 2.609 | 2.703 |
| Project Profit | | | | | | | | | | |
| 1 | 145328.5 | 145332 | 145370.9 | 145367 | 145366.5 | 145442.2 | 145426.5 | 145426.7 | 145393.4 | 145445.5 |
| 5 | 145216.8 | 145273.6 | 145170.5 | 145170.5 | 145278 | 145442.2 | 145437 | 145404.9 | 145381.6 | 145383.4 |
| 10 | -- | -- | -- | -- | -- | 145374.1 | 145387.1 | 145356.6 | 145333.3 | 145225.5 |
| 15 | -- | -- | -- | -- | -- | 145386 | 145314 | 145325.6 | 145260.9 | 145213.1 |
| 20 | -- | -- | -- | -- | -- | 145322.2 | 145299.3 | 145239 | 145199.1 | 145243.3 |
| Project Duration (days) | | | | | | | | | | |
| 1 | 89 | 89 | 89 | 89 | 89 | 89 | 89 | 89 | 89 | 89 |
| 5 | 89 | 89 | 89 | 89 | 89 | 89 | 89 | 89 | 89 | 89 |
| 10 | -- | -- | -- | -- | -- | 89 | 89 | 89 | 89 | 89 |
| 15 | -- | -- | -- | -- | -- | 89 | 89 | 89 | 89 | 89 |
| 20 | -- | -- | -- | -- | -- | 89 | 89 | 89 | 89 | 89 |
| Percentage of infeasible solutions ((number of infeasible solutions/total number of solutions)×100) | | | | | | | | | | |
| 1 | 217.7 | 221.7 | 221.3 | 220.9 | 224 | 0.188 | 0.109 | 0.129 | 0.248 | 0.327 |
| 5 | 31866.9 | 30872 | 29623.3 | 27609.4 | 31738.5 | 0.188 | 0.139 | 0.218 | 0.228 | 0.297 |
| 10 | -- | -- | -- | -- | -- | 0.168 | 0.168 | 0.158 | 0.208 | 0.257 |
| 15 | -- | -- | -- | -- | -- | 0.198 | 0.168 | 0.198 | 0.168 | 0.228 |
| 20 | -- | -- | -- | -- | -- | 0.178 | 0.168 | 0.218 | 0.208 | 0.337 |

*Fig. 18*

METHOD OF GENERATING PRECEDENCE-PRESERVING CROSSOVER AND MUTATION OPERATIONS IN GENETIC ALGORITHMS

BACKGROUND OF THE INVENTION

1. Field of the Invention

The present invention relates to genetic algorithms, and particularly to a computerized method of generating precedence-preserving crossover and mutations operations for genetic algorithms used for optimization and search problems in computer science.

2. Description of the Related Art

A genetic algorithm (GA) is a search technique used in computing to find exact or approximate solutions to optimization and search problems. Genetic algorithms are categorized as global search heuristics. Genetic algorithms are a particular class of evolutionary algorithms (EA) that use techniques inspired by evolutionary biology, such as inheritance, mutation, selection, and crossover.

Genetic algorithms are implemented in a computer simulation in which a population of abstract representations (called chromosomes or the genotype of the genome) of candidate solutions (called individuals, creatures, or phenotypes) to an optimization problem evolves toward better solutions. Traditionally, solutions are represented in binary as strings of 0s and 1s, but other encodings are also possible. The evolution usually starts from a population of randomly generated individuals and happens in generations. In each generation, the fitness of every individual in the population is evaluated, multiple individuals are stochastically selected from the current population (based on their fitness), and modified (recombined and possibly randomly mutated) to form a new population. The new population is then used in the next iteration of the algorithm. Commonly, the algorithm terminates when either a maximum number of generations has been produced, or a satisfactory fitness level has been reached for the population. If the algorithm has terminated due to a maximum number of generations, a satisfactory solution may or may not have been reached.

Genetic algorithms find application in bioinformatics, phylogenetics, computational science, engineering, economics, chemistry, manufacturing, mathematics, physics and other fields. A typical genetic algorithm requires a genetic representation of the solution domain and a fitness function to evaluate the solution domain.

A standard representation of the solution is as an array of bits. Arrays of other types and structures can be used in essentially the same way. The main property that makes these genetic representations convenient is that their parts are easily aligned due to their fixed size, which facilitates simple crossover operations. Variable length representations may also be used, but crossover implementation is more complex in this case. Tree-like representations are explored in genetic programming and graph-form representations are explored in evolutionary programming.

In genetic algorithms, crossover is a genetic operator used to vary the programming of a chromosome or chromosomes from one generation to the next. It is analogous to reproduction and biological crossover, upon which genetic algorithms are based. In a "one-point" crossover, a single crossover point on both parents' organism strings is selected. All data beyond that point in either organism string is swapped between the two parent organisms. The resulting organisms are the children.

Two-point crossover calls for two points to be selected on the parent organism strings. Everything between the two points is swapped between the parent organisms, rendering two child organisms. Another crossover variant, the "cut and splice" approach, results in a change in length of the children strings. The reason for this difference is that each parent string has a separate choice of crossover point. In the above schemes, the two parents are combined to produce two new offspring.

In the "uniform crossover" scheme (UX), individual bits in the string are compared between two parents. The bits are swapped with a fixed probability, typically 0.5. In the half uniform crossover scheme (HUX), exactly half of the non-matching bits are swapped. Thus, first, the Hamming distance (i.e., the number of differing bits) is calculated. This number is divided by two. The resulting number is how many of the bits that do not match between the two parents will be swapped.

Depending on how the chromosome represents the solution, a direct swap may not be possible. One such case is when the chromosome is an ordered list, such as an ordered list of the cities to be travelled for the traveling salesman problem. A crossover point is selected on the parents. Since the chromosome is an ordered list, a direct swap would introduce duplicates and remove necessary candidates from the list. Instead, the chromosome up to the crossover point is retained for each parent. The information after the crossover point is ordered as it is ordered in the other parent. For example, if our two parents are ABCDEFGHI and IGAHFDBEC and our crossover point is after the fourth character, then the resulting children would be ABCDIGHFE and IGAHBCDEF.

The "fitness function" is defined over the genetic representation and measures the quality of the represented solution. The fitness function is always problem dependent. For example, in the knapsack problem, one wants to maximize the total value of objects that can be put in a knapsack of some fixed capacity. A representation of a solution might be an array of bits, where each bit represents a different object, and the value of the bit (0 or 1) represents whether or not the object is in the knapsack. Not every such representation is valid, as the size of objects may exceed the capacity of the knapsack. The fitness of the solution is the sum of values of all objects in the knapsack if the representation is valid, or 0 otherwise. In some problems, it is hard or even impossible to define the fitness expression; in these cases, interactive genetic algorithms are used.

Once the genetic representation and the fitness function are defined, GA proceeds to initialize a population of solutions randomly, then improve it through repetitive application of mutation, crossover, inversion and selection operators. Initially, many individual solutions are randomly generated to form an initial population. The population size depends on the nature of the problem, but typically contains several hundreds or thousands of possible solutions. Traditionally, the population is generated randomly, covering the entire range of possible solutions (i.e., the "search space"). Occasionally, the solutions may be "seeded" in areas where optimal solutions are likely to be found.

During each successive generation, a proportion of the existing population is selected to breed a new generation. Individual solutions are selected through a fitness-based process, where fitter solutions (as measured by a fitness function) are typically more likely to be selected. Certain selection methods rate the fitness of each solution and preferentially select the best solutions. Other methods rate only a random sample of the population, as this process may be very time-consuming.

Most functions are stochastic and designed so that a small proportion of less fit solutions are selected. This helps keep the diversity of the population large, preventing premature convergence on poor solutions. Popular and well-studied selection methods include roulette wheel selection and tournament selection.

The next step is to generate a second generation population of solutions from those selected through genetic operators: crossover (also called recombination), and/or mutation. For each new solution to be produced, a pair of "parent" solutions is selected for breeding from the pool selected previously. By producing a "child" solution using the above methods of crossover and mutation, a new solution is created which typically shares many of the characteristics of its "parents". New parents are selected for each child, and the process continues until a new population of solutions of appropriate size is generated. Although reproduction methods that are based on the use of two parents are more "biology inspired", recent research suggests more than two "parents" are better to be used to reproduce a good quality chromosome.

These processes ultimately result in the next generation population of chromosomes that is different from the initial generation. Generally, the average fitness will have increased by this procedure for the population, since only the best organisms from the first generation are selected for breeding, along with a small proportion of less fit solutions, for the reasons noted above.

This generational process is repeated until a termination condition has been reached. Common terminating conditions include: a solution is found that satisfies minimum criteria; a fixed number of generations are reached; an allocated budget (computation time/money) is reached; the highest ranking solution's fitness is reaching or has reached a plateau such that successive iterations no longer produce better results; manual inspection or combinations of the above.

The process generally follows the steps of: Choose the initial population of individuals; evaluate the fitness of each individual in that population; repeat on this generation until termination; select the best-fit individuals for reproduction; breed new individuals through crossover and mutation operations to give birth to offspring; evaluate the individual fitness of new individuals; and replace least-fit population with new individuals.

In genetic algorithms, mutation is a genetic operator used to maintain genetic diversity from one generation of a population of chromosomes to the next. It is analogous to biological mutation. An example of a mutation operator is a probability that an arbitrary bit in a genetic sequence will be changed from its original state. A common method of implementing the mutation operator involves generating a random variable for each bit in a sequence. This random variable tells whether or not a particular bit will be modified.

The purpose of mutation in GAs is to allow the algorithm to avoid local minima by preventing the population of chromosomes from becoming too similar to each other, thus slowing or even stopping evolution. This reasoning also explains the fact that most GA systems avoid only taking the fittest of the population in generating the next, but rather a random (or semi-random) selection with a weighting toward those that are fitter.

As noted above, in GAs, potential solutions to a problem are represented as a population of chromosomes. Each chromosome in turn is composed of a string of values each is being referred to as a gene. The chromosomes evolve through successive generations. In order to exploit and explore potential solutions, offspring chromosomes are created by merging two parent chromosomes using a crossover operator or modifying an existing chromosome using a mutation operator. There are many methods of crossover and mutation operators.

One method of crossover operators is the one-cut-point method, which randomly selects one cut-point at parent chromosomes and exchanges the genes at one side of the cut points of the two parent chromosomes to generate two offspring chromosomes. On the other hand, one method of mutation operator is the uniform mutation method, which alters one or more genes in the chromosome within a specified range, according to a predefined mutation rate. During each generation, the chromosomes are evaluated on their performance with respect to the fitness functions (objective functions). Chromosomes of high fitness have higher survival probabilities. After several generations, chromosomes in the new generation may be closely identical, or certain termination conditions are met. The final chromosomes hopefully represent the optimal or near-optimal solutions to a problem.

The method of gene coding in a chromosome hinges upon the particular problem at hand. The typical time/cost trade-off problem can be formulated as a numerical optimization problem in the GAs. In this particular problem, the values of the genes in a chromosome represent possible durations of the project activities. The one-cut-point crossover and uniform mutation operators can be used efficiently for the time/cost trade-off problems. Resource allocation problems represent a typical ordering problem, as the main concern is to determine the activities' priority to fulfill the constrained resources. Accordingly, the genes represent activities' identifications and a chromosome represents a possible order of activities. A chromosome structure can be such that an activity in a higher order, from left to right, has a higher priority of getting resources than the previous activities. However, there is a possibility that character duplication and/or omission occurs after implementing the crossover and mutation operators.

Likewise, the unlimited resource leveling problem can be translated into a normal numerical optimization problem using GA techniques. Resource leveling problems represent a typical scheduling problem with the objective of minimizing the fluctuation in resource usage. The genes represent activities' start times and a chromosome represents a possible project schedule. In contrast with ordering problems, scheduling problems features specific precedence relationships among genes. Accordingly, the implementation of the one-cut-point crossover and uniform mutation operators for the leveling problem may cause violation of the precedence relationships of the offspring chromosomes. This problem entails checking the output chromosomes of the crossover and mutation operators and repairing of the infeasible chromosomes. This check/repair process causes considerable computational inefficiency to the GA technique.

It would be desirable to generate and employ precedence-preserving crossover and mutation operators for chromosomes encoding activities' start times to avoid the inefficiency caused by the basic GAs technique, through detecting and repairing the infeasible chromosomes each time these operators are performed.

A crucial challenge for construction contractors to run a sustained business is the ability to timely procure adequate money to execute construction operations. Besides owners' payments, contractors often procure an additional component of funding from external sources, including bank credit lines to supplement owners' payments. Given the facts that the owners actually pay after the accomplishment of the work, while retaining some amount of money, and the cash that contractors are allowed to withdraw from credit-line accounts is limited in amount, contractors often operate under cash-constrained conditions. Accordingly, the premise that the best proactive operating strategy contractors can follow for effective financial planning is to schedule the construction activities based on the cash availability is strongly advocated.

Typically, an additional cost component for financing is associated with cash procurement through the banks' credit lines. Contractors normally deposit owners' progress payments into the credit-line accounts to continually reduce the outstanding debit and, consequently, the financing costs. As the cash flow in FIG. 3 indicates, contractors charge the expenses caused by labor, equipment, materials, subcontractors, and other indirect costs ($E_t$) against, and deposit progress payments ($P_t$) into the credit-line accounts. It can be reasonably assumed in practice that these transactions occur as of the cut-off times between periods.

Accordingly, the values of the outstanding debt F as of the cut-off times are determined. The financing costs $\hat{I}$, as of the cut-off times are determined by applying the prescribed interest rate to the outstanding debt. The summations of the values of the outstanding debt and the accumulated financing costs constitute the negative cumulative balance $\hat{F}_t$. The cumulative net balance values $\hat{N}_t$, constitute the negative cumulative balances after depositing the progress payments. The cumulative net balance of all $E_t$, $P_t$, and $\hat{I}_t$ transactions constitutes the profit G as of the end of the project.

Another concern of financing, though more important than the incorporation of financing costs, constitutes the credit-limit constraints imposed on the credit lines. The credit limit specifies the maximum value the negative cumulative balance is allowed to reach as of any cut-off time. Thus, finance-based scheduling incorporates financing costs into the project total cost as well as schedules activities' such that the contractor's negative cumulative balance as of any cut-off time never top the specified credit limit. The optimization techniques employed to devise finance-based schedules normally fulfill these two goals with the objective of maximizing the profit at the end of the project. This objective is directly conducive to the minimization of the indirect costs through minimizing the project duration, and the financing costs. In order to achieve this objective, a search technique based on artificial intelligence (i.e., the GAs technique) is used.

Implementing the GAs technique in the problem of finance-based scheduling involves the steps of: devising a schedule extension scheme; setting chromosome structure; defining the chromosome evaluation criterion; generating an initial population of chromosomes; employing an offspring generation crossover and mutation operators; and coding the procedure in a computer program.

Devising a schedule that is constrained with a specified credit limit entails extending the project duration. As such, the problem at hand necessitates devising a project extension scheme. The extension scheme for an exemplary 13-activity schedule (shown in FIG. 4) is illustrated in FIG. 5, which, in bar chart form, shows the activities' total floats extended by seven-day extension increments. The extended total floats of activities, portrayed in front of activities in FIG. 5, provide time spaces within which activities can be shifted without increasing the extended project duration of twenty days. For example, activity D in FIG. 5 can be shifted all the way to the end of its extended total float and still allows activity H, which depends on activity D, to finish before the end of its extended total float. Thus, the shift of activity D can be performed without causing further extension beyond the extended project duration.

The GAs technique, harnessed with extension schemes, devises schedules at constricted credit limits such that the cumulative balance values never top the specified credit limit, while minimizing the schedule extension. The extension schemes transform the process of seeking extended schedules that fulfill cash constraints from searching in boundless solution spaces to searching in well-defined and definite solution spaces.

The chromosome structure features a string of genes with the number of genes being the same as the number of activities in the CPM network. The gene values correspond to start times assigned to the activities. As such, each chromosome represents one possible schedule. FIG. 6 shows the chromosome structure for the initial schedule of the 13-activity extension scheme in FIG. 5.

To evaluate chromosomes, the evaluation criterion is set as the expected contractor's profit at the end of the project. Initially, the project cash flow parameters are determined, as outlined above with regard to general finance-based scheduling, to produce the negative cumulative balance values, project duration, and profit. These values are constants that are equivalent to the initial schedule with no constraints imposed on the credit limit. When the GAs is applied to devise a schedule at a specific credit limit and a gene is being evaluated, the start time values of that gene are assigned to the corresponding project activities to produce a new schedule with a new duration, profit, and negative cumulative balance values. Provided that the negative cumulative balance values are below the specified credit limit, the fitness of the gene associated with that schedule is then determined by the relative improvement it exhibits over the initial schedule, as indicated by the amount of profit.

The seven-day extension scheme shown in FIG. 5 is used to illustrate the generation of the chromosomes of the initial population. Activities A through M are shown (with primes indicating the activities of the generated chromosome). The steps of the algorithm are as follows: (1) Identify activities with no predecessors (i.e., activities A, B, C, D); (2) pick up the first activity in the list of the activities identified in step 1 (i.e., activity A); (3) select a random start time of the activity in step 2 such that the activity ends before the end of the adjusted total float, for example, day 3 for activity A; (4) repeat steps 2 and 3 for all of the activities identified in step 1, such as starting activity B at day 5, activity C at day 4, and activity D at day 7; (5) identify all activities that depend exclusively on either all or some of the activities identified in step 1 (i.e., activities E, F, G, and H); (6) pick up the first activity in the list of the activities identified in step 5 (i.e., activity E); (7) select a random start for the activity in step 6 allowing all preceding activities to finish, such as day 6 being the selected start time of activity E; (8) repeat steps 6 and 7 to randomly select start times for all activities identified in step 5, such as day 9 for activity F, day 6 for activity G, and day 10 for activity H; (9) repeat steps 5 through 8 for the activities last scheduled until all the project activities are scheduled (i.e., activities I and j are scheduled first with activity I starting at day 9 and activity j starting at day 13; and (10) activities K, L, and M are scheduled with activity K starting at day 13, activity L starting at day 12, and activity M starting at day 17.

Thus, a method of generating precedence-preserving crossover and mutations operations for genetic algorithms solving the aforementioned problems is desired.

SUMMARY OF THE INVENTION

The method for generating precedence-preserving crossover and mutations operations for genetic algorithms is based on the determination of activities' Forward Free Float (FFF) and Backward Free Float (BFF) values, utilizing these float values in randomly selected forward and backward paths, respectively. The method may be applied to the finance-based scheduling domain using large scale projects, with the chromosomes of the genetic algorithm encoding activities' start times in a resource-constrained scheduling problem.

The method of generating precedence-preserving crossover and mutation operations for genetic algorithms includes the following steps: (a) randomly selecting first and second parent chromosomes from a population of a plurality of chromosomes; (b) calculating a backward free float value of a set of activities; (c) calculating a forward free float value of the set of activities; (d) randomly selecting a cut point activity; (e) forming first and second child chromosomes by randomly selecting either a forward path or a backward path, wherein if the forward path has been selected, then implementing the following set of steps: (f) copying start times of the set of activities to respective left sides of cut points of the first and second parent chromosomes into corresponding left-hand portions of the first and second child chromosomes; (g) determining start times of the activities of right-hand parts of the first and second child chromosomes by forwardly applying the backward free float values of the corresponding start times of the second and first parent chromosomes, respectively, to finish times of preceding activities in the left-hand portions of the first and second child chromosomes; and (h) determining feasibility of resultant chromosomes, whereby a resultant chromosome is determined infeasible if the forward path results in durations of offspring chromosomes that exceed a duration of an extension scheme.

If the backward path has been selected, then the following set of steps are implemented: (i) copying the start times of the set of activities to respective right sides of the cut points of the first and second parent chromosomes into corresponding right-hand portions of the first and second child chromosomes; (j) determining start times of the activities of the left-hand parts of the first and second child chromosomes by backwardly applying the forward free float values of the corresponding start times of the second and first parent chromosomes, respectively, to the start times of following activities in the right hand parts of the first and second child chromosomes, whereby the start times are determined based on the finish times; and (k) resetting the start times of the set of activities so that a starting point of the set of activities is set for a day zero if the backward path results in a negative start time of any of the set of activities.

The mutation operator is generated as: (a) randomly selecting one activity from the set of activities; (b) determining the forward free float value and the backward free float value of the selected activity; and (c) randomly shifting the activity forward or backward within the respective forward free float value or backward free float value.

These and other features of the present invention will become readily apparent upon further review of the following specification and drawings.

BRIEF DESCRIPTION OF THE DRAWINGS

FIG. 17 is a table showing the processing time, profit and project duration of the conventional prior art genetic algorithm and the present method for generating precedence-preserving crossover and mutations operations for genetic algorithms according to the present invention for the 30-activity network.

FIG. 18 is a table showing the processing time, profit and project duration of the conventional prior art genetic algorithm and the present method for generating precedence-preserving crossover and mutations operations for genetic algorithms according to the present invention for the 120-activity network.

Similar reference characters denote corresponding features consistently throughout the attached drawings.

DETAILED DESCRIPTION OF THE PREFERRED EMBODIMENTS

Figure 4:
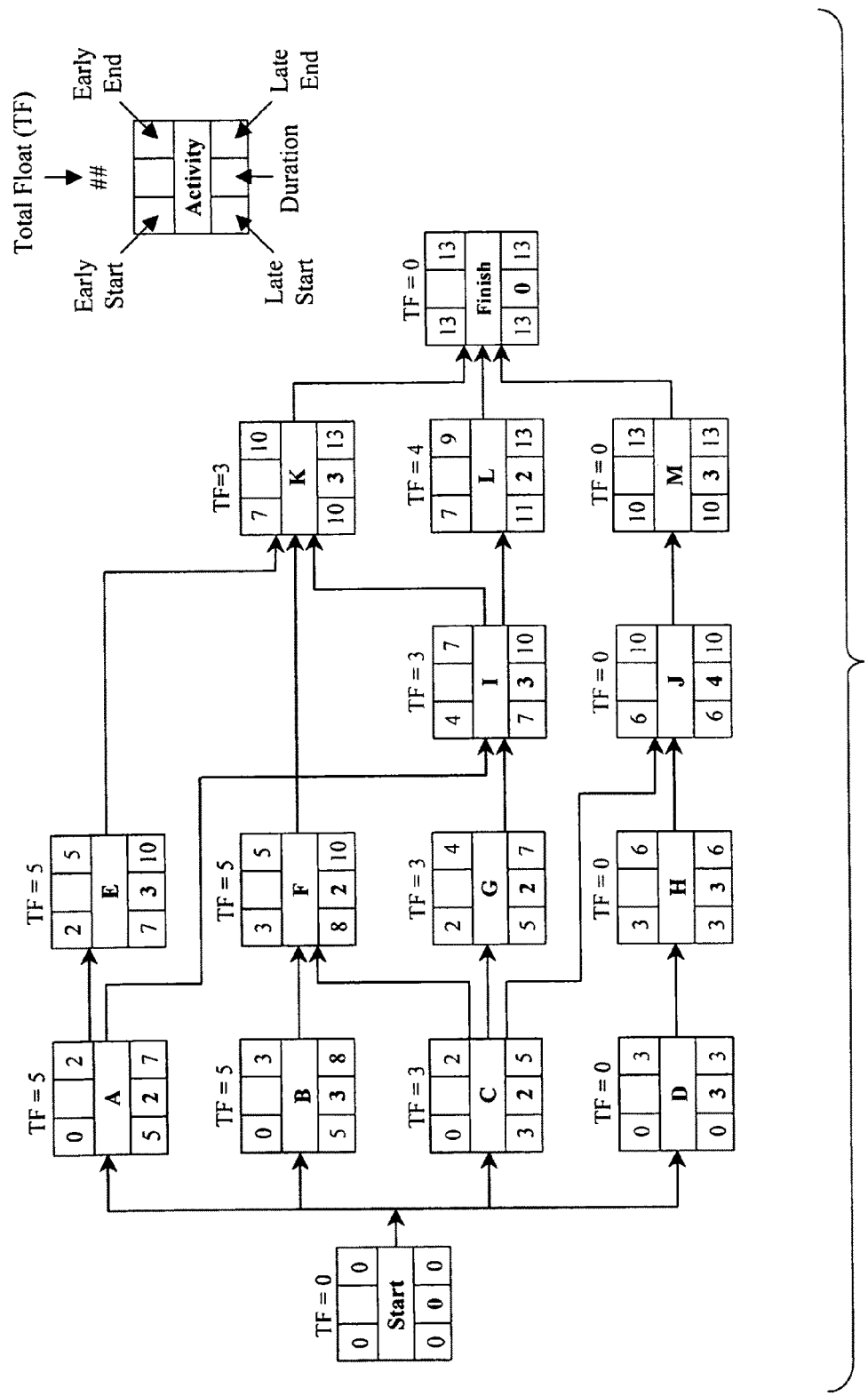
FIG. 4 is a diagram illustrating an exemplary CPM network associated with an exemplary 13-activity project.

The method of generating precedence-preserving crossover and mutation operations for genetic algorithms is based on the determination of activities' Forward Free Float (FFF) and Backward Free Float (BFF) values, utilizing these float values in randomly selected forward and backward paths, respectively. The method may be applied to the finance-based scheduling domain using large scale projects, with the chromosomes of the genetic algorithm encoding activities' start times in a resource-constrained scheduling problem. The algorithms for generating the crossover and mutation operators are explained and demonstrated using the exemplary 13-activity CPM network shown in FIG. 4.

The present crossover operator includes two paths: a forward path and a backward path. The forward path utilizes the conventional Forward Free Float (FFF) while the backward path utilizes the conventional Backward Free Float (BFF). BFF is the number of days the start time of an activity can be advanced without violating the finish-to-start relationships between this activity and the preceding activities. The BFF arises from the nature of the extension scheme when a certain activity is shifted forward, thus leaving a gap between the start time and the finish times of the preceding activities.

Figure 1A:
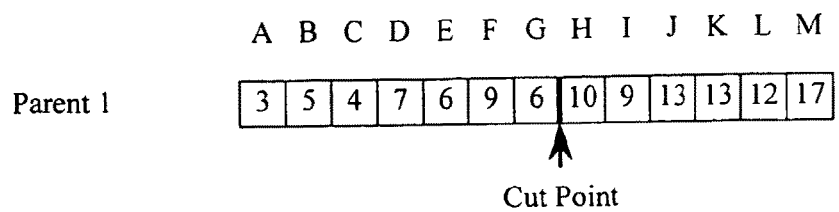
FIG. 1A is a diagrammatic representation of a crossover operator following a forward path of the method for generating precedence-preserving crossover and mutations operations for genetic algorithms according to the present invention.
Figure 1A:
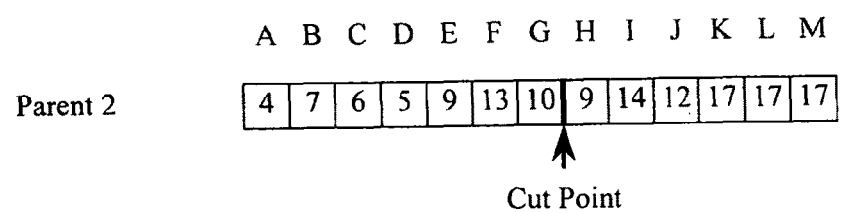
Figure 1A:
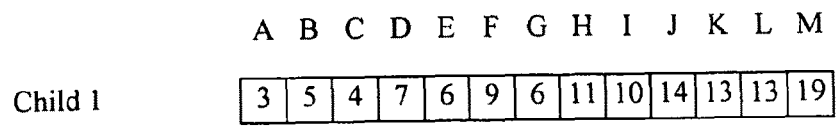
Figure 1A:
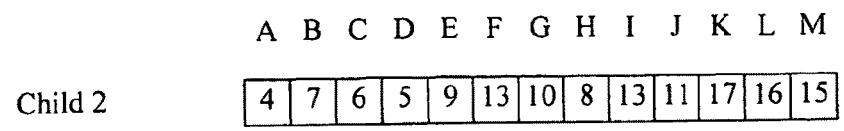
Figure 1B:
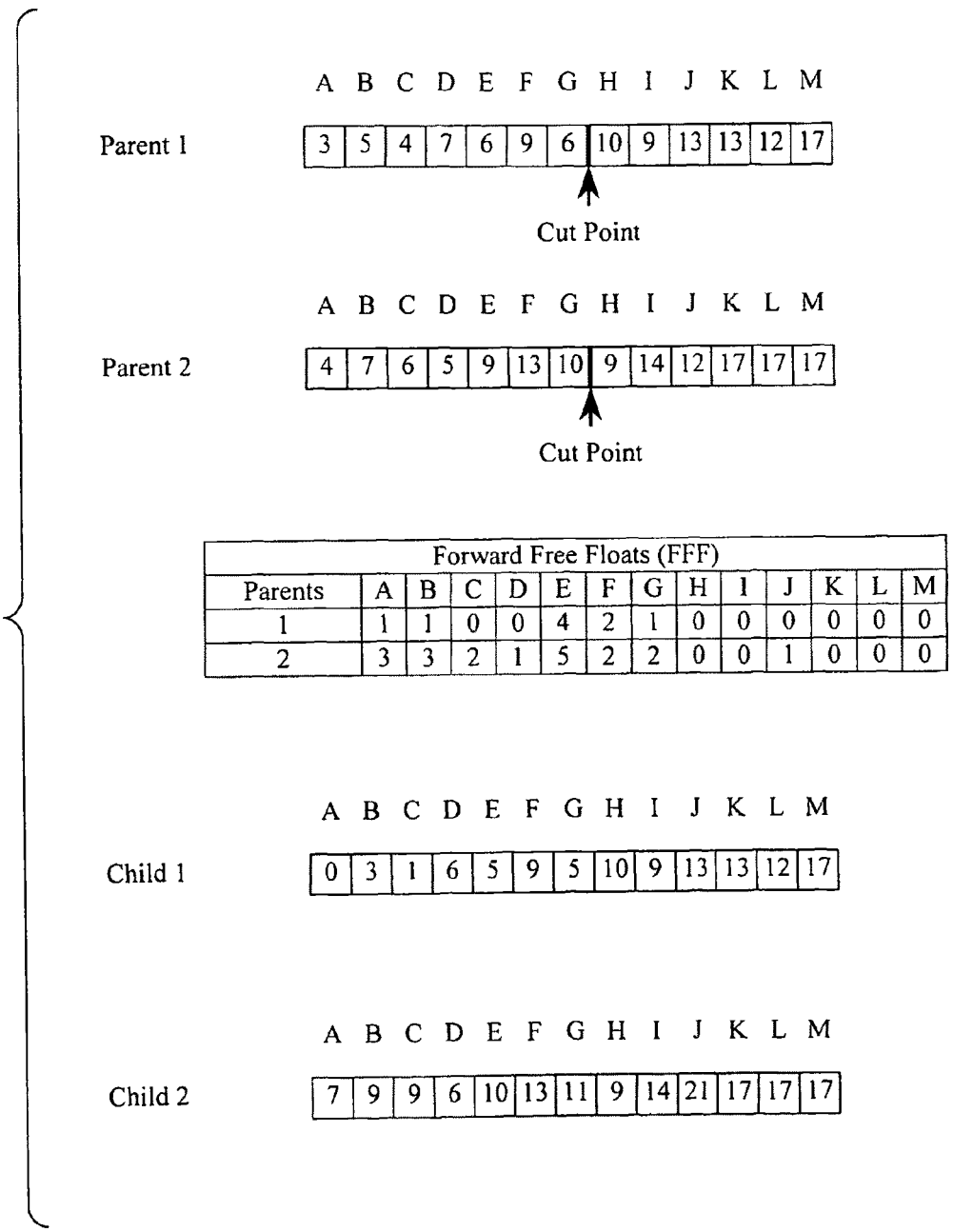
FIG. 1B is a diagrammatic representation of a crossover operator following a backward path of the method for generating precedence-preserving crossover and mutations operations for genetic algorithms according to the present invention.
Figure 5:
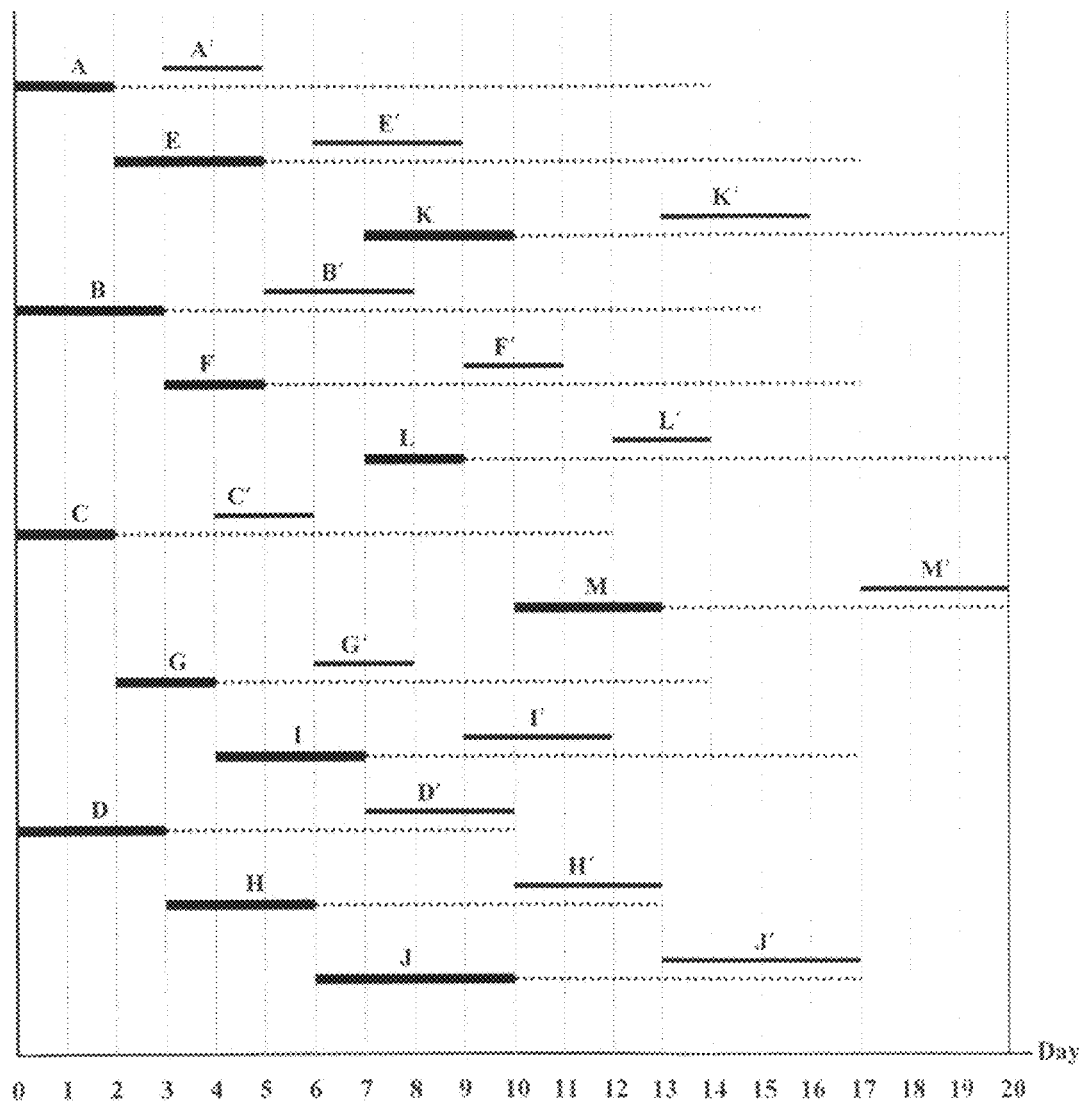
FIG. 5 is a diagram illustrating a seven-day extension scheme for the 13-activity project of FIG. 4.
Figure 6:
FIG. 6 is a diagram illustrating a complete chromosome of the 13-activity project of FIG. 4.

The steps for generating the child chromosomes in FIG. 1A and FIG. 1B are given below: (a) randomly select two parent chromosomes from the population (it should be noted that parent-one chromosome is the generated chromosome shown in FIG. 5); (b) calculate the BFF of the activities (the BFF values of the starting activities A, B, C and D are considered null so as not to allow these activities to move backward); (c) calculate the Forward Free Float (FFF) of the activities (the FFF values of the terminating activities K, L and M are considered null so as not to allow these activities to move forward); (d) randomly select the cut-point activity, which is located after the first seven genes; and (e) form the chromosomes for two children by randomly selecting to implement a forward path or a backward path.

Step (e) proceeds as follows: (i) for the forward path illustrated in FIG. 1A, the first and second-child chromosomes are formed by copying the start times of the activities to the left sides of the cut points of parents one and two, respectively, into the left-hand parts of the child chromosomes; (ii) the start times of the activities of the right-hand parts of the first and second-child chromosomes are determined by forwardly applying the BFF values of their counterparts in parents two and one, respectively, to the finish times of the preceding activities in the left-hand parts of child chromosomes; (iii) the forward path may result in durations of the offspring chromosomes that exceed the duration of the extension scheme (this happened in child one in the example of FIG. 1A, as activity M ends at day 22; these chromosomes are considered infeasible); (iv) for the backward path of FIG. 1B, the first and second-child chromosomes are formed by copying the start times of the activities to the right sides of the cut points of parents one and two, respectively, into the right-hand parts of the child chromosomes; (v) the finish times of the activities of the left-hand parts of the first and second-child chromosomes are determined by backwardly applying the FFF values of their counterparts in parents two and one, respectively, to the start times of the following activities in the right-hand parts of the child chromosomes. The start times are determined based on the finish times; (vi) the backward path may result in a negative start time of certain activities in the beginning of the network. In this case, the start times of all the activities of the network are increased to make the activity start at day zero.

Figure 2:
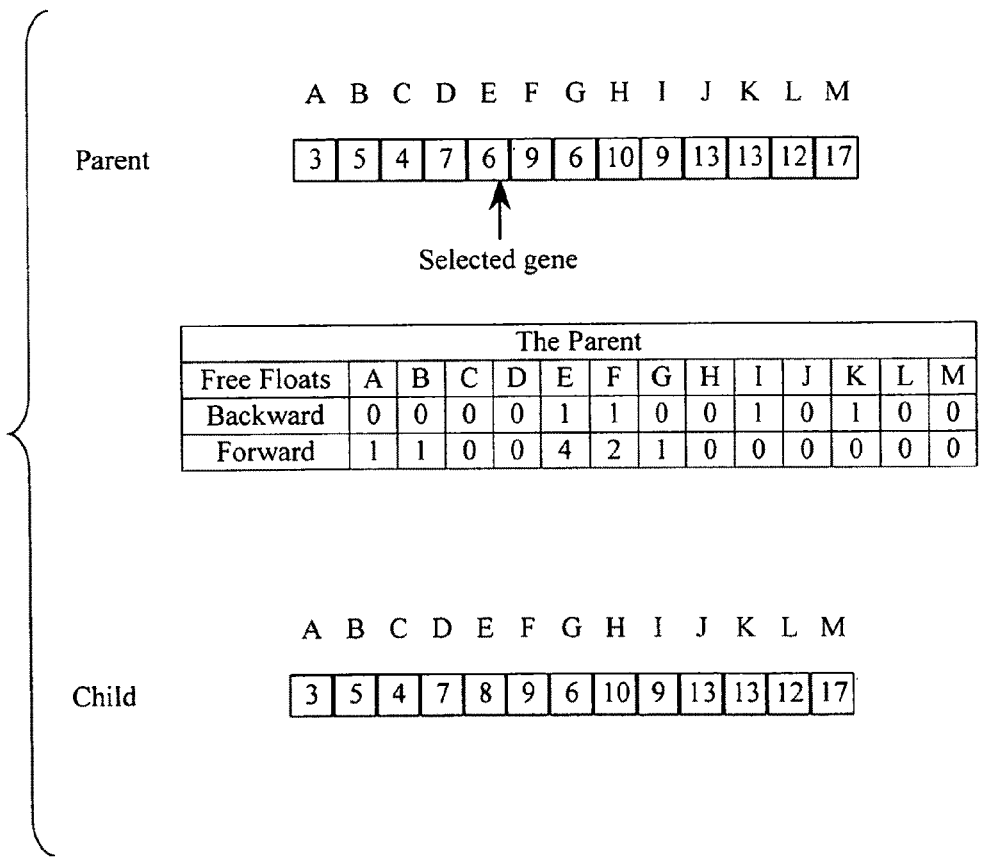
FIG. 2 is a diagrammatic representation of a mutation operator of the method for generating precedence-preserving crossover and mutations operations for genetic algorithms according to the present invention.
Figure 3:
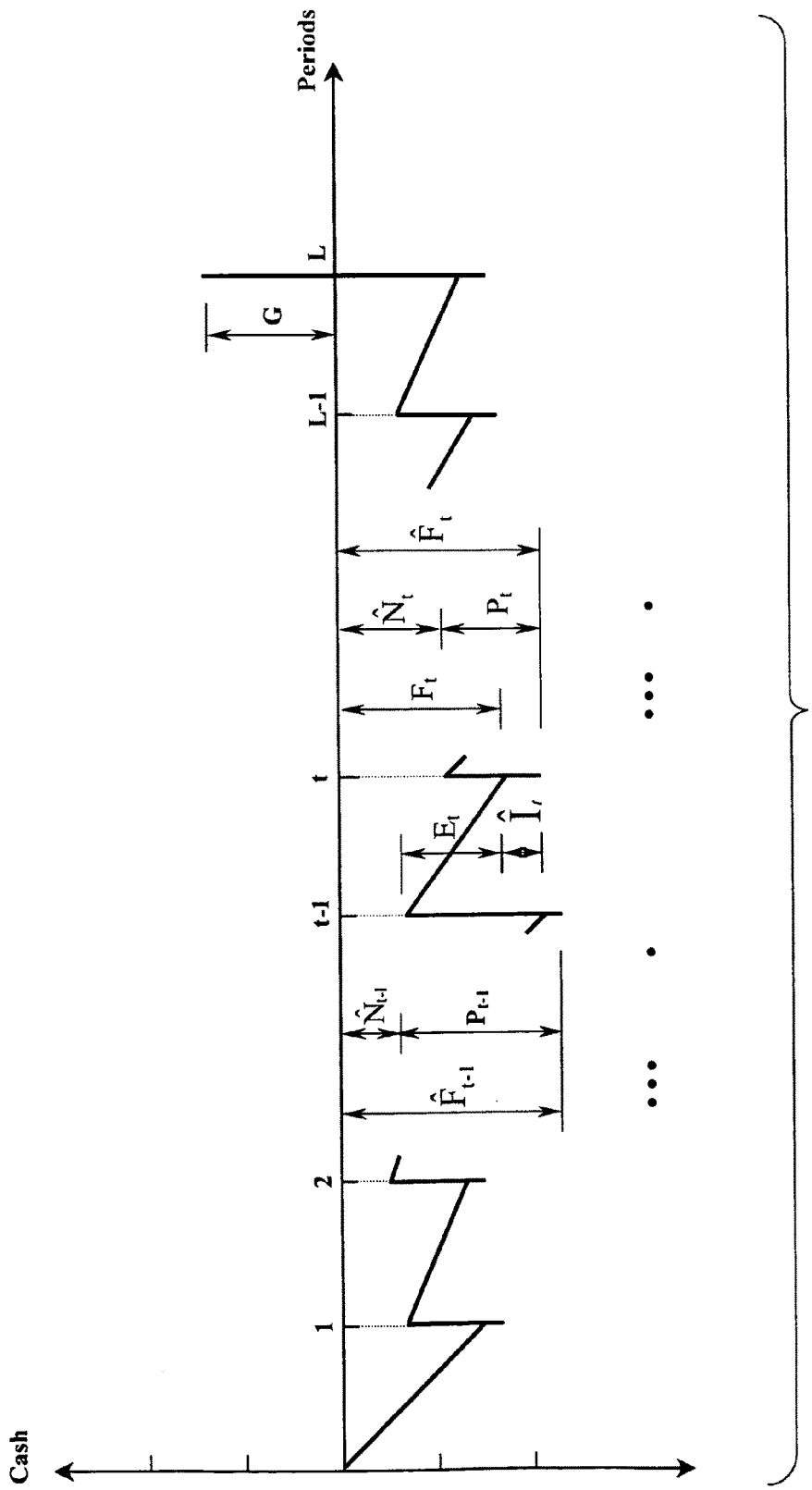
FIG. 3 is a diagram illustrating exemplary cash flow of an exemplary construction project.

The steps for forming the mutation operator are given below, and with reference to FIG. 2: (a) randomly select one activity (such as activity E in the example of FIG. 2); (b) determine the FFF and BFF of the selected activity (for activity E, the FFF is four days and the BFF is one day); (c) randomly shift the activity forward or backward within the values of the FFF or BFF, respectively (the start of activity E is shifted by two days).

As noted above, the present crossover and mutation operators are generated for finish-to-start relationships based on the determination of FFF and BFF. However, the operators are still valid for the other relationships, including start-to-start, finish-to-finish, and start-to-finish, provided that the FFF and BFF are determined accurately. Similarly, the validity of the proposed operators can be extended to CPM networks with lag relationships.

Figure 7:
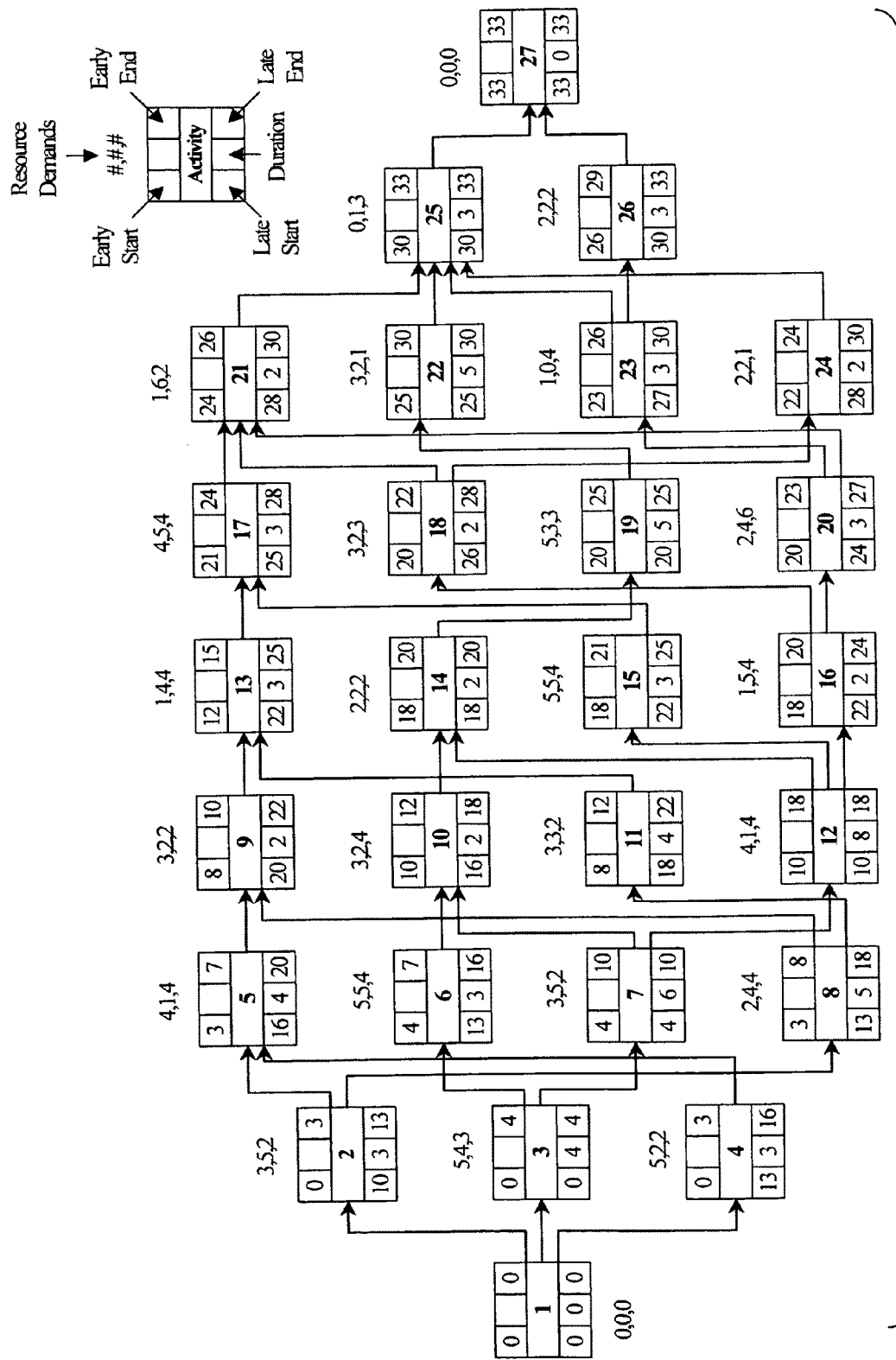
FIG. 7 is a diagram illustrating an exemplary CPM network associated with an exemplary 27-activity project.

The genetic algorithm using the above-generated operators has been compared against an actual example in order to demonstrate the method's capability to produce identical results. Although the method is given within the context of finance-based scheduling, the typical problem domain of resource-constrained scheduling was selected to make the comparison more meaningful. Accordingly, an actual 27-activity CPM network, shown in FIG. 7, was adapted for the present comparison. FIG. 7 shows the activities' durations, relationships, and requirements of resource units of three different resource types. The initial project duration is 33 days. A conventional genetic algorithm technique was utilized to reschedule the project under the constraints that the maximum available units of each resource type are limited to 10 units. The objective of the conventional technique was to fulfill the three resource constraints while minimizing the extension in the project duration. An optimum schedule of 35-day duration was obtained. The initial population, crossover percentage, and mutation percentage were defined as 50, 40%, and 60%, respectively. The conventional, prior art genetic algorithm was implemented using Microsoft® Visual Basic® 4.0 and the time the system took was approximately three minutes using a personal computer (PC) with an Intel Pentium® processor running at 133 Hz and with 32 MB of random access memory (RAM).

Figure 8:
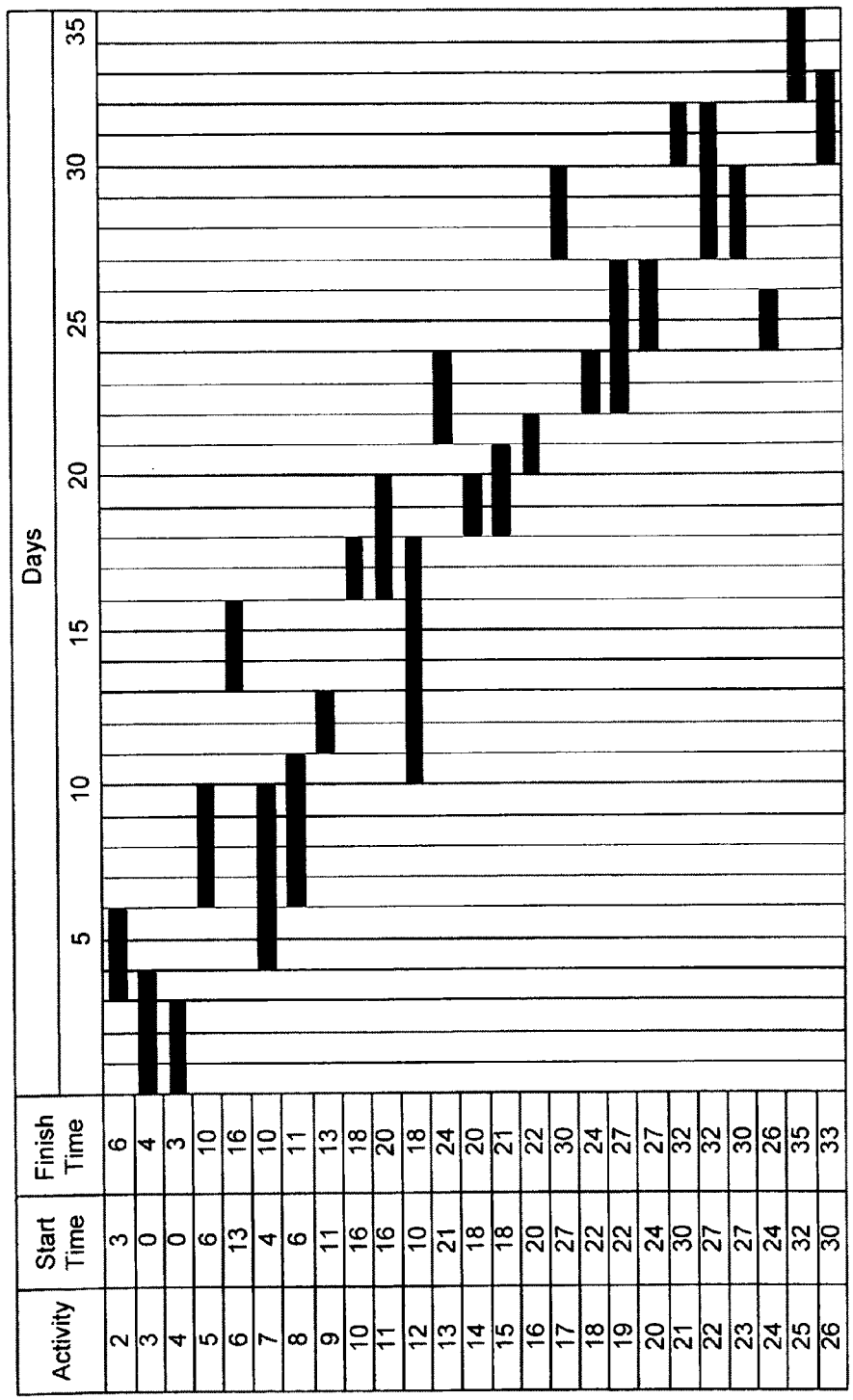
FIG. 8 is a diagram illustrating a schedule for the 27-activity project of FIG. 7.

The crossover and mutation operators of the present method were employed in a genetic algorithm scheme to solve the resource-constrained scheduling problem shown in FIG. 7. The present method output the optimum schedule of the problem at the same duration of 35 days, as shown in FIG. 8. The results are slightly different in the start times of some activities, as shown, but the project durations were identical. This method was implemented using FORTRAN, and the time the system took to reach the optimum schedule was approximately thirteen seconds using a desktop computer with a 1.8 GHz processor and with 512 MB of RAM.

Figure 16:
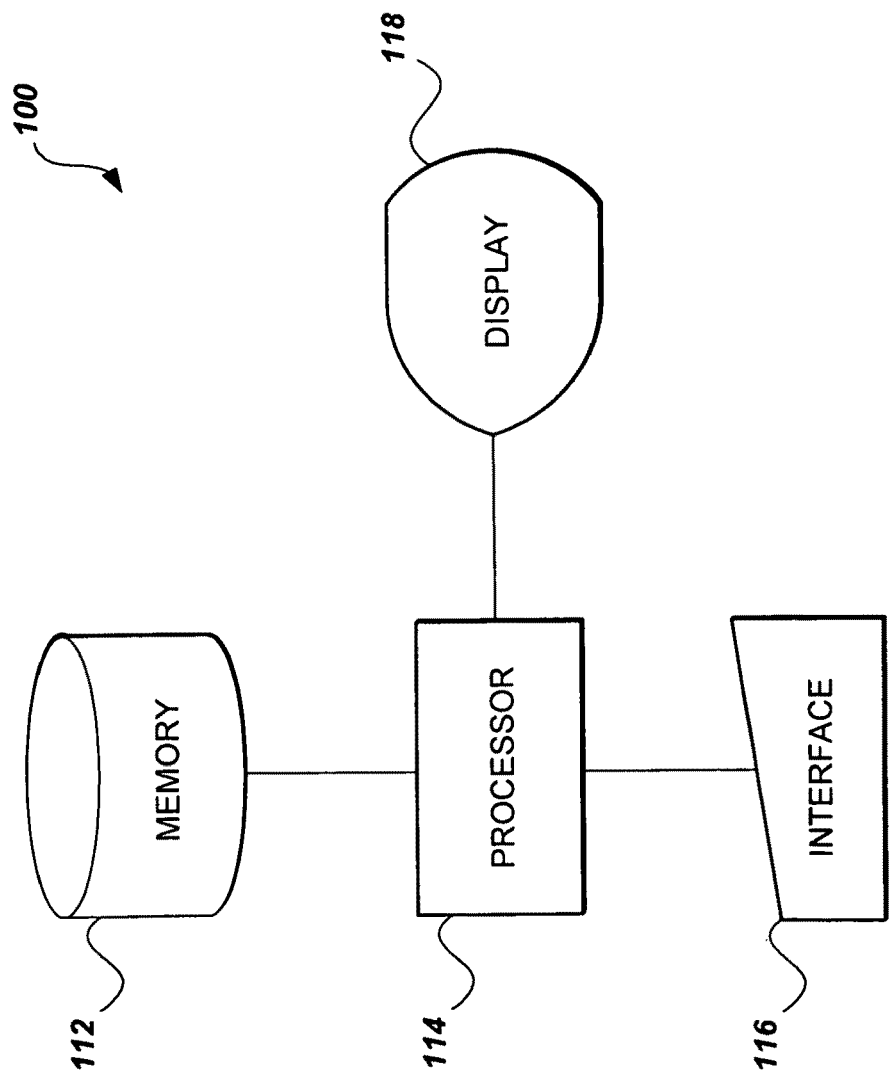
FIG. 16 is a block diagram illustrating system components for implementing the method for generating precedence-preserving crossover and mutations operations for genetic algorithms according to the present invention.

It should be understood that the calculations may be performed by any suitable computer system, such as that diagrammatically shown in FIG. 16. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

In order get the best performance, the method underwent a tuning process to define the parameters, including the extension increment, the population size, and the crossover and mutation probabilities. The parameters of the extension increment and population size are related, as the length of extension increment determines the number of chromosomes that can be randomly generated. A scheme with zero extension increment provides only the activities' total floats to randomly generate the chromosomes of the initial population, which might not allow for generating the required number of chromosomes. Thus, a relatively long extension increment of 27 days was employed, and trials were performed to define the best population size.

Figure 9:
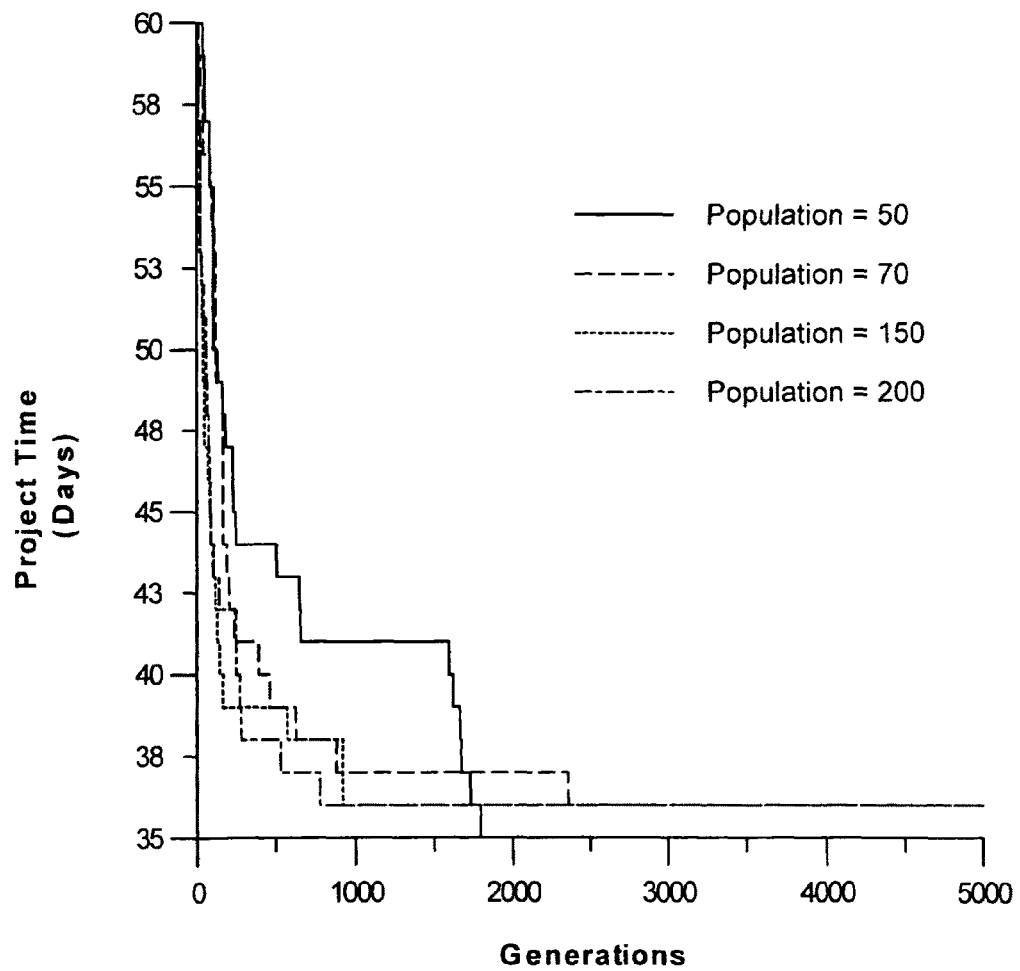
FIG. 9 is a graph illustrating a convergence rate of the method for generating precedence-preserving crossover and mutations operations for genetic algorithms according to the present invention applied to a resource-constrained scheduling problem.
Figure 10:
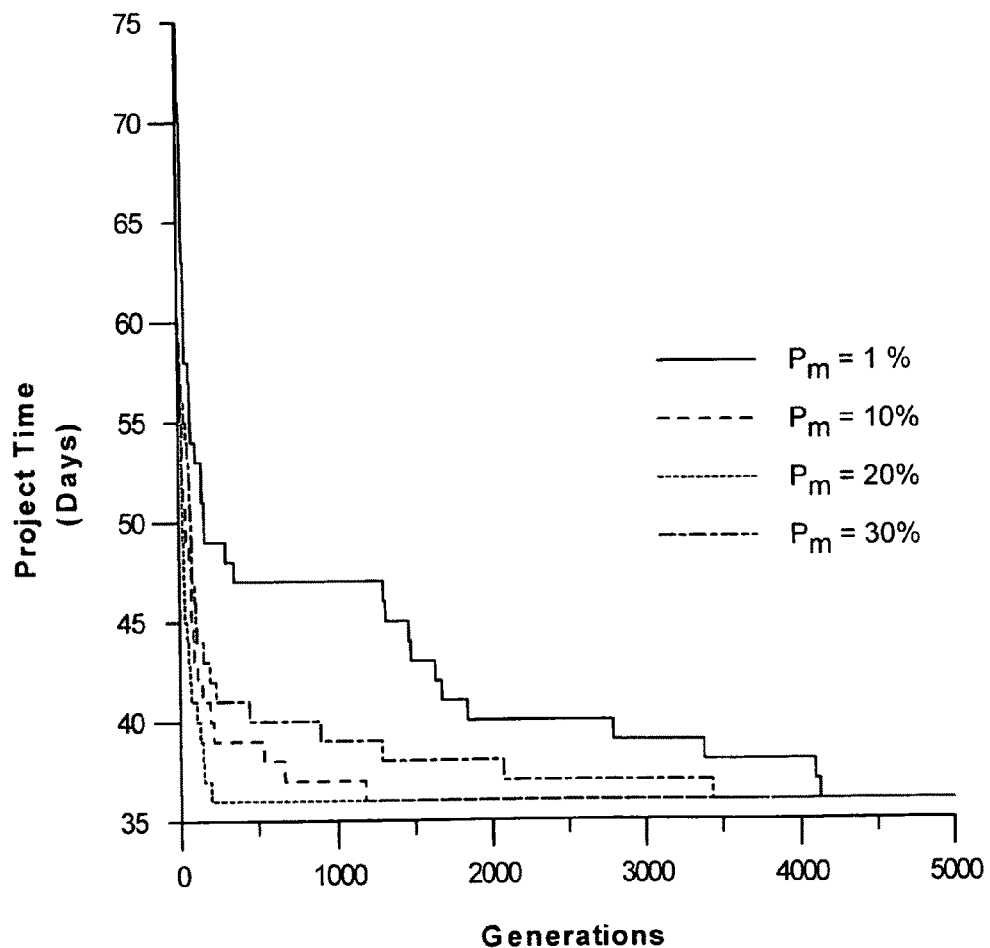
FIG. 10 is a graph illustrating a convergence rate of the method for generating precedence-preserving crossover and mutations operations for genetic algorithms according to the present invention applied to a resource-constrained scheduling problem.
Figure 11:
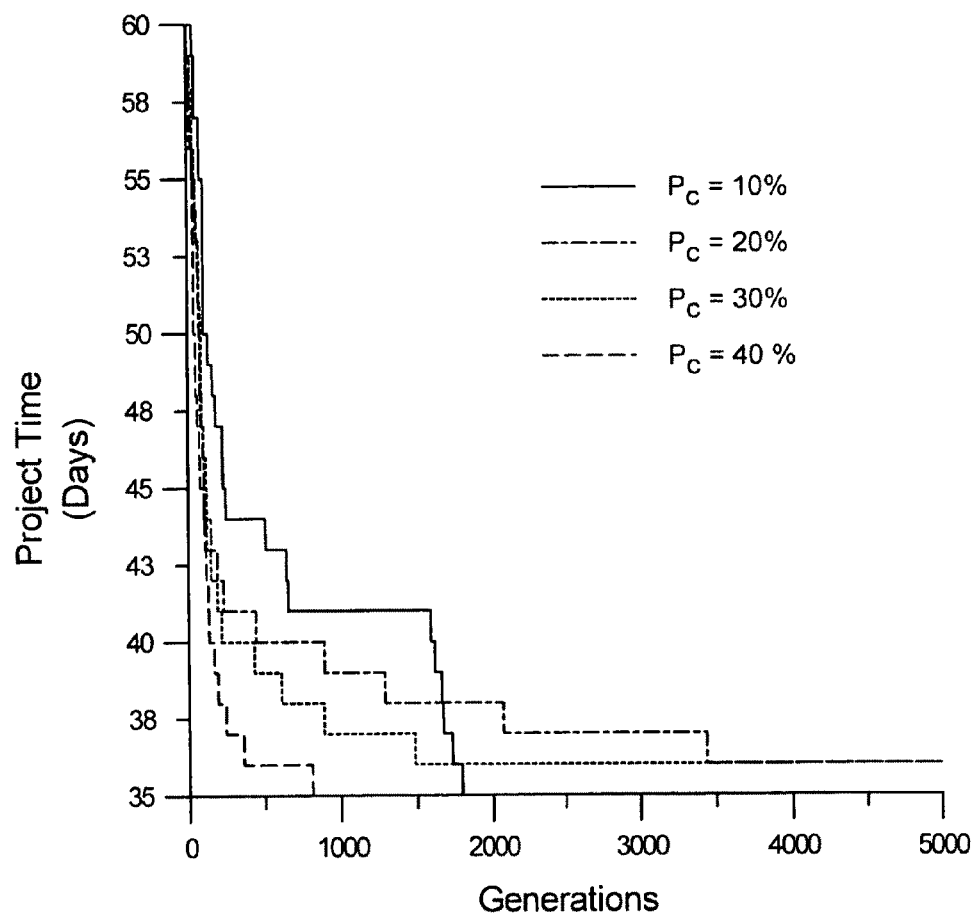
FIG. 11 is a graph illustrating a convergence rate of the method for generating precedence-preserving crossover and mutations operations for genetic algorithms according to the present invention applied to a resource-constrained scheduling problem.

The results of the trials at fixed mutation and crossover percentages of 10% and 10%, respectively, indicated that the algorithm converges faster at a population size of fifty, as shown in FIG. 9. Further, at a population size of fifty, and a moderate crossover percentage of 50%, trials were performed to define the best mutation percentage. The results of the trials were such that convergence at a project duration of 36 days occurred using different mutation percentages, as shown in FIG. 10. Since the system shows no convergence to the optimum project duration at different mutation percentages, many trials using different possible combinations of the crossover and mutation percentages and a fixed population size of fifty were performed. It was found, as shown in FIG. 11, that the algorithm converges well at crossover and mutation percentages of 40% and 10%, respectively. Although the problem was the same, the mutation and crossover percentages resulting in the optimum schedule in the proposed system were different from those in the conventional, prior art methodology.

Figure 12:
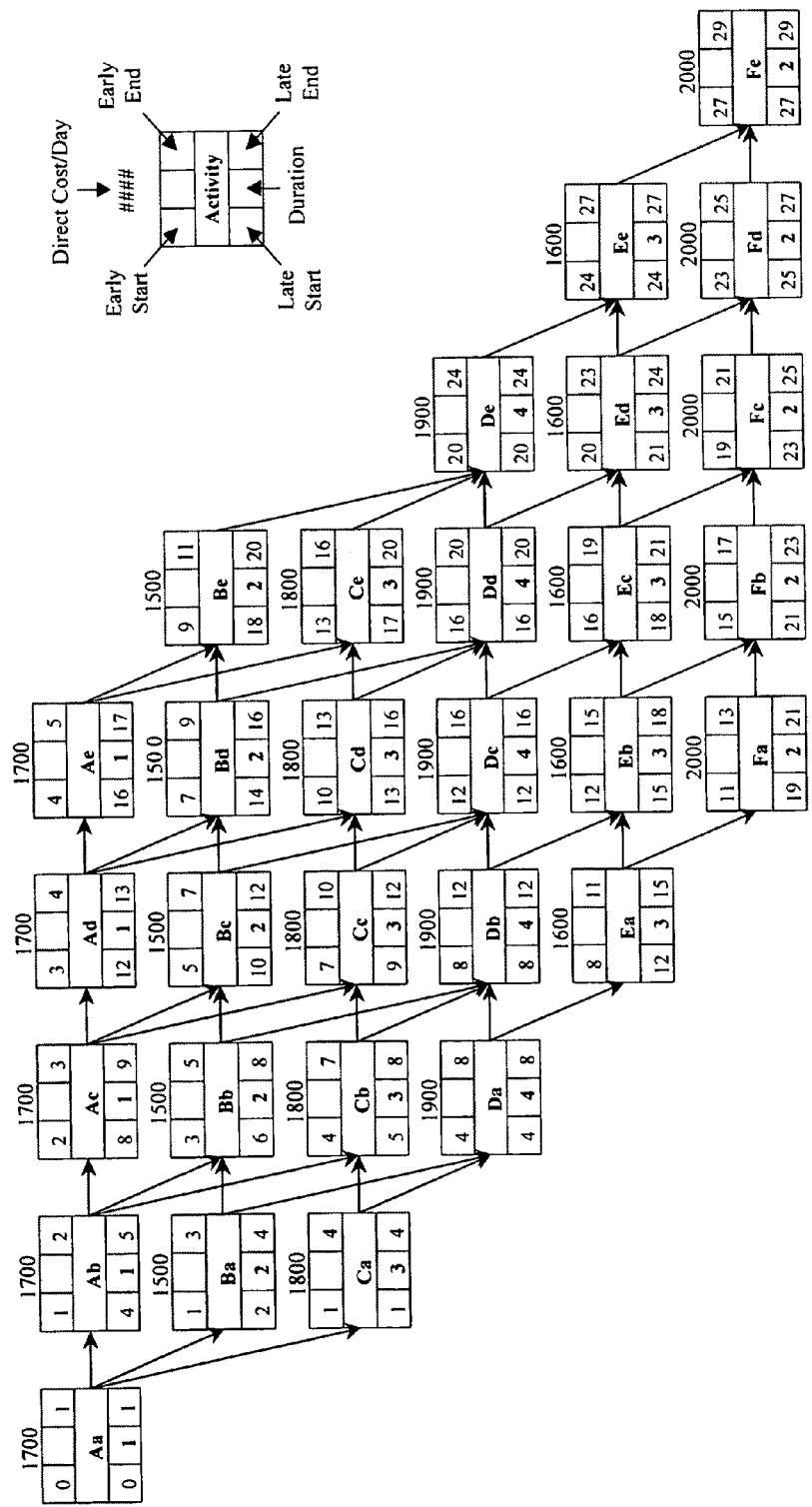
FIG. 12 is a diagram illustrating an exemplary CPM network associated with an exemplary 30-activity project.

To evaluate the effectiveness of the crossover and mutation operators, two genetic algorithm methods based on both the conventional prior art algorithm and the present method were tested on two CPM networks, constituting 30 and 120 activities, respectively. The 30-activity network is illustrated in FIG. 12. The values used for the financial parameters are given below in Table 1:

TABLE 1

Values of the financial parameters

| Financial parameter | Networks | |
|---|---|---|
| | 30 activity | 120 activity |
| Overhead costs | 15% | 15% |
| Mobilization cost | 15% | 25% |
| Taxes | 2% | 2% |
| Markup | 8% | 20% |
| Bond premium | 1% | 1% |
| Advance payment | 10% | 5% |
| Retained amount of payments | 10% | 5% |
| Delay penalty per day | 1000 | 2000 |
| Financing cost rate per week | 0.8% | 0.8% |

In order to provide common grounds for comparison, 100 identical schedules as an initial population for both the conventional prior art and the inventive algorithms were generated. Then, the crossover and mutation operators were employed to generate 100 offspring schedules for each generation. The performance of the conventional prior art and the inventive algorithms was evaluated after the completion of 1000 generations for the 30-activity network, and 100 generations for the 120-activity network.

FIGS. 17 and 18 respectively present the results of performance criteria for the conventional prior art and the inventive algorithms for the 30-activity and 120-activity networks at credit limits of $63,000 and $300,000, respectively. The results were obtained at mutation probability percentages in the range of 1% to 20%, and crossover probability percentages in the range of 60% to 100%. The performance criteria used to evaluate the two genetic algorithm methodologies include the processing time, profit, project duration, and percentage of infeasible solutions.

Infeasible schedules often arise upon using the conventional crossover and mutation operators in chromosome reproduction. Infeasible schedules are those undergoing dependency violations and, thus, must be discarded. The conventional genetic algorithm method omits the infeasible schedules and continues the reproduction process until 100 feasible schedules are devised for each generation. The higher the encountered number of infeasible schedules, the longer the processing time the genetic algorithm takes to complete the generations.

In contrast, the present method employs a precedence-preserving mechanism that ensures the fulfillment of dependency among activities. However, a chromosome is considered infeasible in the present method when the duration exceeds the duration of the extension scheme. Though these chromosomes have yet to define valid schedules, and given the fact that the method will eventually eliminate the unnecessarily-extended schedules, the present inventive method considers these chromosomes as infeasible and discards them. FIGS. 17 and 18 show that the percentage of infeasible solutions in the present method was negligible compared to that of the conventional prior art method.

Figure 13:
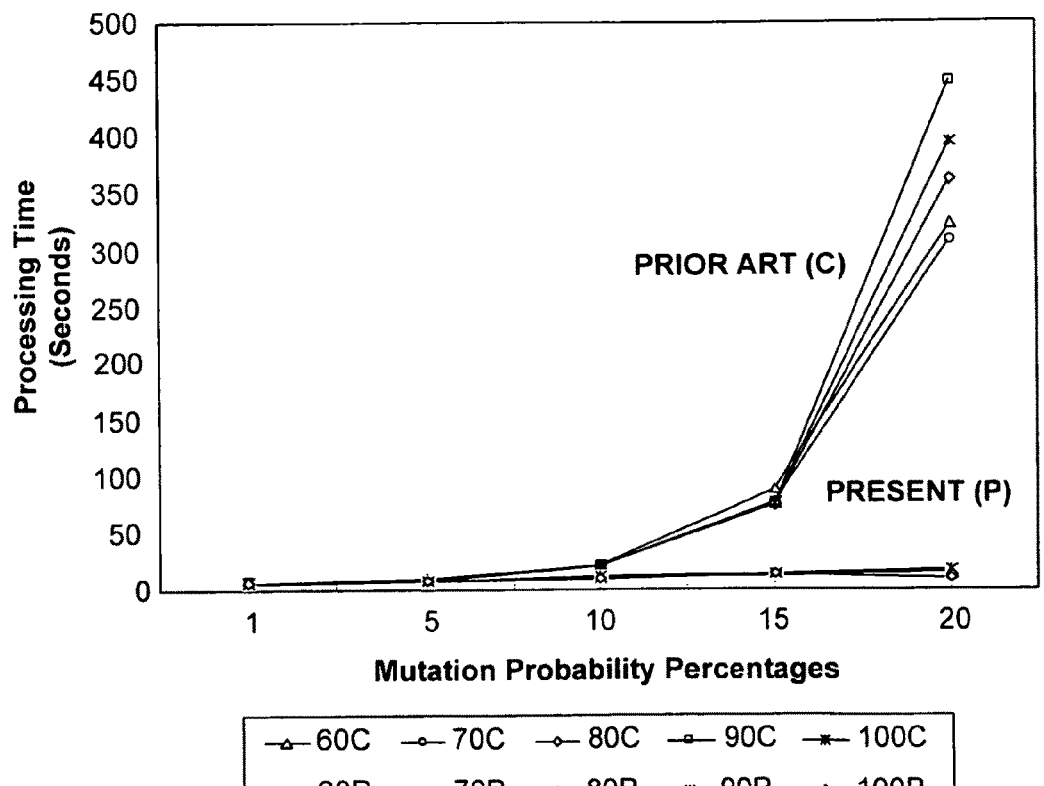
FIG. 13 is a graph illustrating processing time of method for generating precedence-preserving crossover and mutations operations for genetic algorithms according to the present invention compared with a conventional prior art genetic algorithm for the 30-activity project of FIG. 12.
Figure 14:
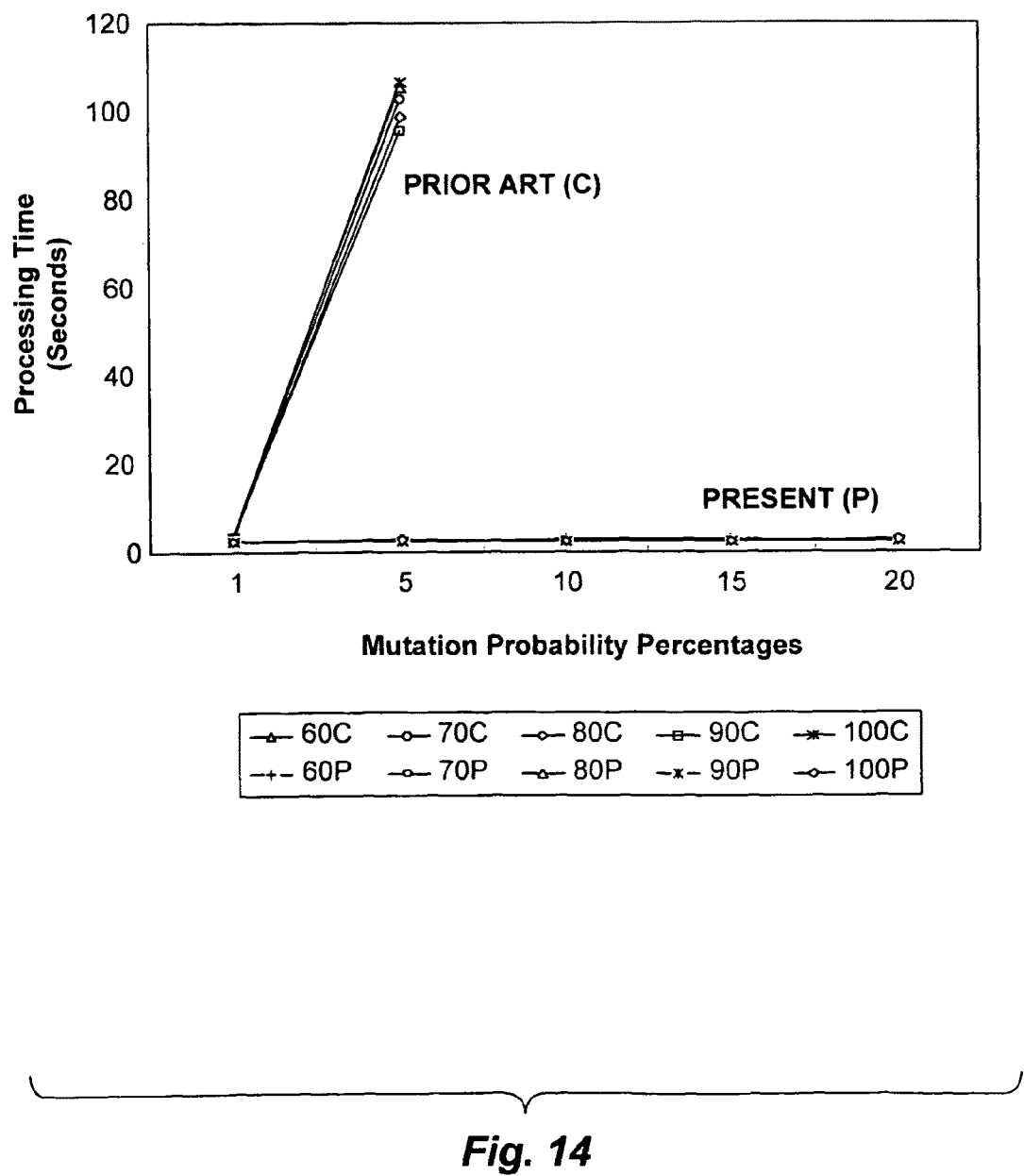
FIG. 14 is a graph illustrating processing time of method for generating precedence-preserving crossover and mutations operations for genetic algorithms according to the present invention compared with a conventional prior art genetic algorithm for a 120-activity project.

FIG. 13 shows that the processing time values of the present method is appreciably less than the values for the conventional scheme at a mutation percentage of 10% for 30-activity networks. The processing time of the conventional method increases exponentially at higher mutation percentages. Additionally, FIG. 13 indicates that at mutation percentages of 15%, the processing time of the conventional method varies appreciably as the crossover percentage varies from 60% to 100%. This variation is very significant at a mutation percentage of 20%. The same trends of the exponential increase in processing time, and the appreciable variation at mutation percentage of 5%, are shown in FIG. 14 for the 120-activity networks. The results indicate that the saving in processing time achieved by the present inventive method is approximately 97% at 100% crossover percentage and mutation percentages of 20% for the 30-activity networks. Almost the same percentage was achieved for the 120-activity networks at 100% crossover percentage and mutation percentages of 5%. However, no convergence of the conventional algorithm occurred at mutation percentages above 5% for the 120-activity networks after prolonged runtimes.

The observed exponential increase in the processing time values, as well as the variation, indicate that the conventional mutation and, with lesser impact, the conventional crossover, produces too many infeasible solutions at every generation, which leads to a prolonged processing time to synthesize the population. Thus, the conventional mutation above 10% for the 30-activity networks and 1% for 120-activity networks caused too much disturbance for the genetic algorithm. In contradistinction, the processing time of the present inventive method is almost fixed with no variation, regardless of the percentages of mutation and crossover for the 30-activity and 120-activity networks. This occurs because the percentages of infeasible solutions are negligible. This indicates that the present crossover and mutation operators continually introduce new solutions that substantially improve the efficiency of the genetic algorithm. These results show that the present crossover and mutation operators are highly effective and provide robust tools for genetic algorithms.

For the 30-activity and 120-activity networks, FIGS. 17 and 18 show that the profit values of the inventive method are always higher than those of the conventional genetic algorithm. The results in FIG. 18 indicate, for the 120-activity network, that at a mutation percentage of 1%, the profit values of the inventive method were slightly higher than the profit values of the conventional prior art method, whereas at a mutation percentage of 5%, the differences were more pronounced. These differences in profit values between the conventional and inventive methods exist though both methods output the same project duration of 89 days. In other words, though the substantial cost component of overheads were identical in the outputs of the inventive and conventional methods, the inventive method scheduled the project activities more efficiently to minimize the lesser component of financing costs for a large-scale project of 120 activities. Additionally, FIG. 18 shows that the best profit values of the inventive method were obtained at a mutation percentage of 1%.

Figure 15:
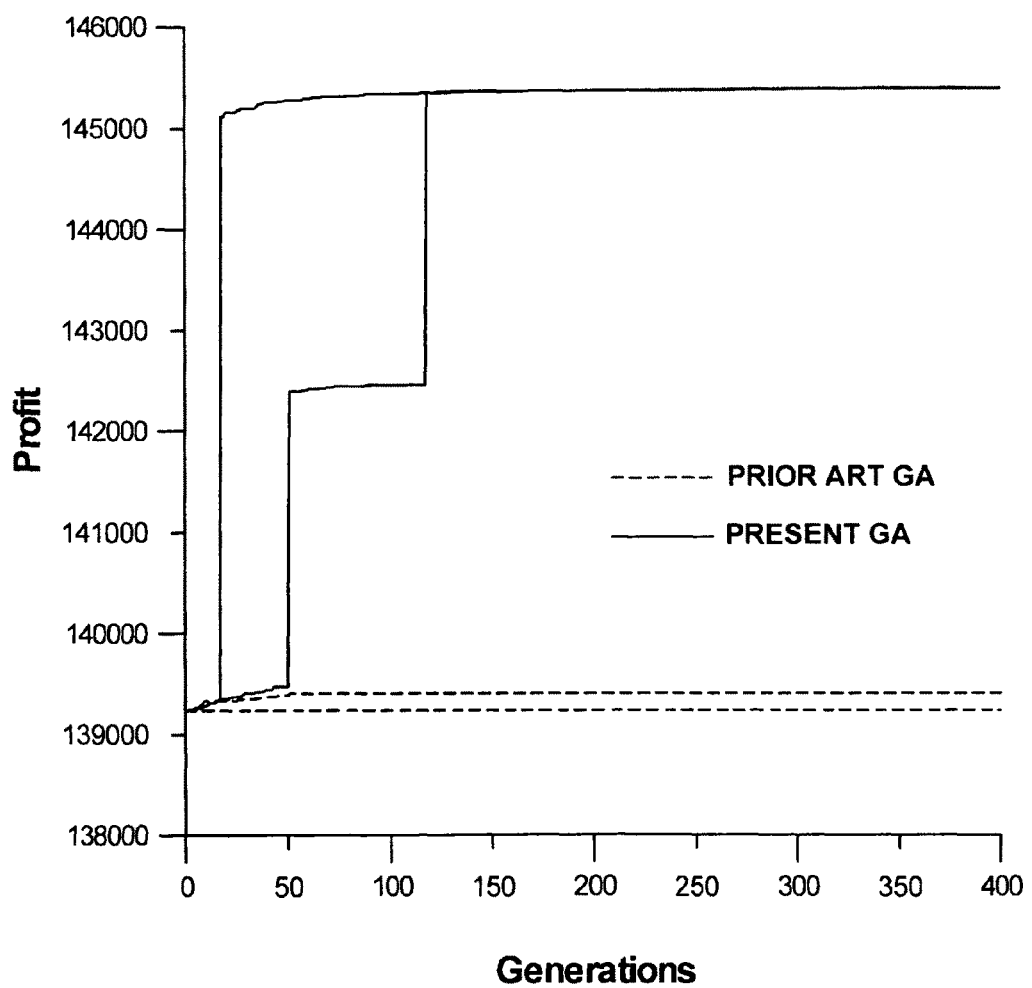
FIG. 15 is a graph illustrating a convergence rate of the method for generating precedence-preserving crossover and mutations operations for genetic algorithms according to the present invention applied to the 120-activity project.

FIG. 15 shows the convergence rate to the profit maximum value with increase of the number of generations of the 120-activity network at a crossover percentage of 60%, mutation percentages of 1% and %5, and a credit limit of $195,000. FIG. 15 illustrates that the present method outperforms the conventional genetic algorithm. When the maximum profit was reached after about fifty generations in both methods, at a mutation percentage of 1%, the profit value for the conventional GA method was far below that of the present inventive method. The convergence of the present method was faster at a mutation percentage of 1% than at 5%.

It is to be understood that the present invention is not limited to the embodiments described above, but encompasses any and all embodiments within the scope of the following claims.

We claim:

1. A computerized method of generating operations for a genetic algorithm, comprising the steps of:
   (a) randomly selecting first and second parent chromosomes from a population of a plurality of chromosomes;
   (b) calculating a backward free float value of a set of activities;
   (c) calculating a forward free float value of the set of activities;
   (d) randomly selecting a cut point activity;
   (e) forming first and second child chromosomes by randomly selecting either a forward path or a backward path, wherein if the forward path has been selected, then implementing the steps of:
      (f) copying start times of the set of activities to respective left sides of cut points of the first and second parent chromosomes into corresponding left-hand portions of the first and second child chromosomes;
      (g) determining start times of the activities of right-hand parts of the first and second child chromosomes by forwardly applying the backward free float values of the corresponding start times of the second and first parent chromosomes, respectively, to finish times of preceding activities in the left-hand portions of the first and second child chromosomes; and
      (h) determining feasibility of resultant chromosomes, whereby a resultant chromosome is determined infeasible if the forward path results in durations of offspring chromosomes that exceed a duration of an extension scheme;
   and if the backward path has been selected, then implementing the steps of:
      (i) copying the start times of the set of activities to respective right sides of the cut points of the first and second parent chromosomes into corresponding right-hand portions of the first and second child chromosomes;
      (j) determining start times of the activities of the left-hand parts of the first and second child chromosomes by backwardly applying the forward free float values of the corresponding start times of the second and first parent chromosomes, respectively, to the start times of following activities in the right hand parts of the first and second child chromosomes, whereby the start times are determined based on the finish times; and
      (k) resetting the start times of the set of activities such that a starting point of the set of activities is set for a day zero if the backward path results in a negative start time of any of the set of activities.

2. The computerized method of generating operations for a genetic algorithm as recited in claim 1, further comprising the step of generating a mutation operator, the generation of the mutation operator comprising the steps of:
   (a) randomly selecting one activity from the set of activities;
   (b) determining the forward free float value and the backward free float value of the selected activity; and
   (c) randomly shifting the activity forward or backward within the respective forward free float value or backward free float value.

3. A system for generating operations for a genetic algorithm, comprising:
   a processor;
   computer readable memory coupled to the processor;
   a user interface coupled to the processor;
   a display coupled to the processor software stored in the memory and executable by the processor, the software having:
      means for randomly selecting first and second parent chromosomes from a population of a plurality of chromosomes;
      means for calculating a backward free float value of a set of activities;
      means for calculating a forward free float value of the set of activities;
      means for randomly selecting a cut point activity; and
      means for forming first and second child chromosomes by randomly selecting either a forward path or a backward path.

4. The system for generating operations of a genetic algorithm as recited in claim 3, wherein, wherein if the forward path has been selected by said means for forming the first and child chromosomes, then said means for forming the first and second child chromosomes implements the steps of:
   (a) copying start times of the set of activities to respective left sides of cut points of the first and second parent chromosomes into corresponding left-hand portions of the first and second child chromosomes;

(b) determining start times of the activities of right-hand parts of the first and second child chromosomes by forwardly applying the backward free float values of the corresponding start times of the second and first parent chromosomes, respectively, to finish times of preceding activities in the left-hand portions of the first and second child chromosomes; and (c) determining feasibility of resultant chromosomes, whereby a resultant chromosome is determined infeasible if the forward path results in durations of offspring chromosomes that exceed a duration of an extension scheme;

wherein if the backward path has been selected by said means for forming the first and child chromosomes, then said means for forming the first and second child chromosomes implements the steps of:

(d) copying the start times of the set of activities to respective right sides of the cut points of the first and second parent chromosomes into corresponding right-hand portions of the first and second child chromosomes;

(e) determining start times of the activities of the left-hand parts of the first and second child chromosomes by backwardly applying the forward free float values of the corresponding start times of the second and first parent chromosomes, respectively, to the start times of following activities in the right hand parts of the first and second child chromosomes, whereby the start times are determined based on the finish times; and (f) resetting the start times of the set of activities such that a starting point of the set of activities is set for a day zero if the backward path results in a negative start time of any of the set of activities.

5. The system for generating operations of a genetic algorithm as recited in claim 4, further comprising means for generating a mutation operator, said means for generating a mutation operator implementing the steps of:

(a) randomly selecting one activity from the set of activities;

(b) determining the forward free float value and the backward free float value of the selected activity; and (c) randomly shifting the activity forward or backward within the respective forward free float value or backward free float value.

6. A computer software product that includes a medium readable by a processor, the medium having stored thereon a set of instructions for generating operations of a genetic algorithm, the instructions comprising:

(a) a first sequence of instructions which, when executed by the processor, causes the processor to randomly select first and second parent chromosomes from a population of a plurality of chromosomes;

(b) a second sequence of instructions which, when executed by the processor, causes the processor to calculate a backward free float value of a set of activities;

(c) a third sequence of instructions which, when executed by the processor, causes the processor to calculate a forward free float value of the set of activities;

(d) a fourth sequence of instructions which, when executed by the processor, causes the processor to randomly select a cut point activity;

(e) a fifth sequence of instructions which, when executed by the processor, causes the processor to form first and second child chromosomes by randomly selecting either a forward path or a backward path, wherein if the forward path has been selected, then implementing the following sequence of instructions:

(f) a sixth sequence of instructions which, when executed by the processor, causes the processor to copy start times of the set of activities to respective left sides of cut points of the first and second parent chromosomes into corresponding left-hand portions of the first and second child chromosomes;

(g) a seventh sequence of instructions which, when executed by the processor, causes the processor to determine start times of the activities of right-hand parts of the first and second child chromosomes by forwardly applying the backward free float values of the corresponding start times of the second and first parent chromosomes, respectively, to finish times of preceding activities in the left-hand portions of the first and second child chromosomes; and (h) an eighth sequence of instructions which, when executed by the processor, causes the processor to determine feasibility of resultant chromosomes, whereby a resultant chromosome is determined infeasible if the forward path results in durations of offspring chromosomes that exceed a duration of an extension scheme;

wherein if the backward path has been selected, then implementing the following sequence of instructions:

(i) a ninth sequence of instructions which, when executed by the processor, causes the processor to copy the start times of the set of activities to respective right sides of the cut points of the first and second parent chromosomes into corresponding right-hand portions of the first and second child chromosomes;

(j) a tenth sequence of instructions which, when executed by the processor, causes the processor to determine start times of the activities of the left-hand parts of the first and second child chromosomes by backwardly applying the forward free float values of the corresponding start times of the second and first parent chromosomes, respectively, to the start times of following activities in the right hand parts of the first and second child chromosomes, whereby the start times are determined based on the finish times; and (k) an eleventh sequence of instructions which, when executed by the processor, causes the processor to resetting the start times of the set of activities such that a starting point of the set of activities is set for a day zero if the backward path results in a negative start time of any of the set of activities.

7. The computer software product that includes a medium readable by a processor, the medium having stored thereon a set of instructions for generating operations of a genetic algorithm as recited in claim 6, further comprising a sequence of instructions for generating a mutation operator, the sequence of instructions for generating the mutation operator comprising the following set of instructions:

(a) randomly selecting one activity from the set of activities;

(b) determining the forward free float value and the backward free float value of the selected activity; and (c) randomly shifting the activity forward or backward within the respective forward free float value or backward free float value.

* * * * *